Aug. 1, 1961 T. C. ANDERSON 2,994,825
VOLTAGE TO TIME-INTERVAL CONVERTER
Filed July 9, 1958
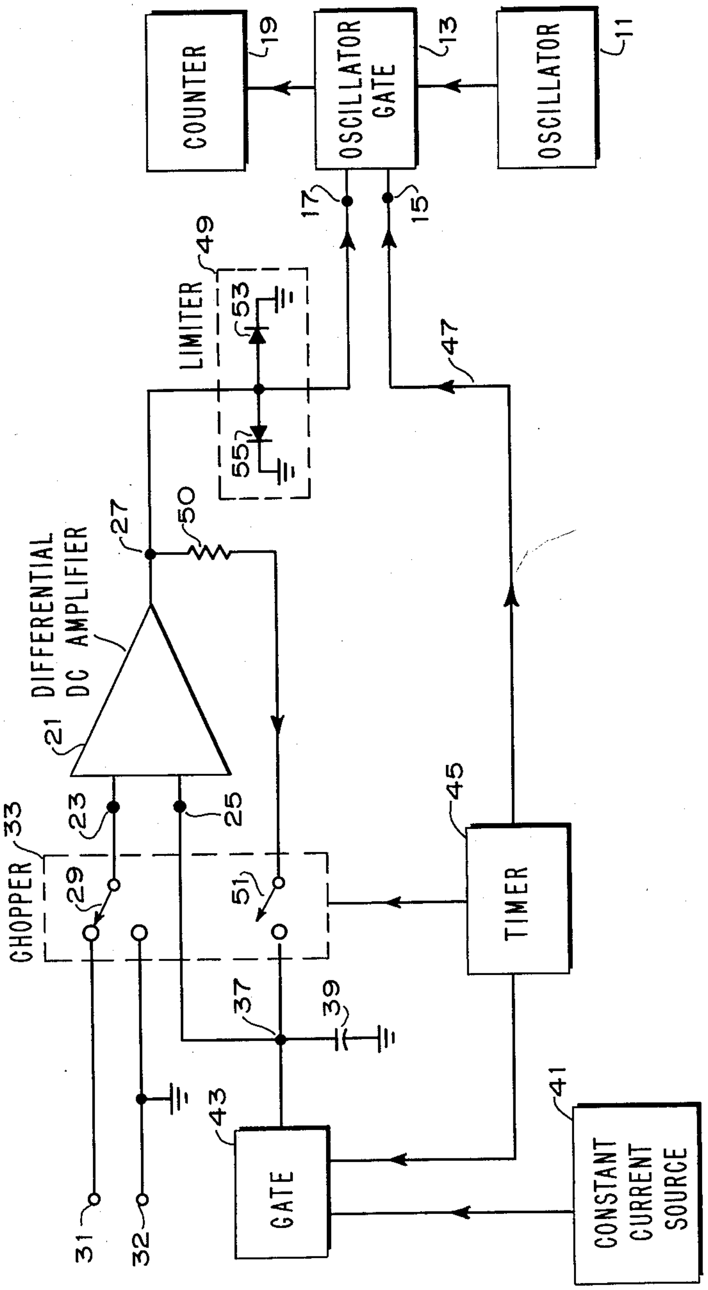
INVENTOR
THEODORE C. ANDERSON
BY [signature]
ATTORNEY United States Patent Office 2,994,825
Patented Aug. 1, 1961

2,994,825

VOLTAGE TO TIME-INTERVAL CONVERTER

Theodore C. Anderson, Palo Alto, Calif., assignor to Hewlett-Packard Company, Palo Alto, Calif., a corporation of California Filed July 9, 1958, Ser. No. 747,538
1 Claim. (Cl. 328—129)

This invention relates to a measuring circuit which accurately converts a voltage to a time interval proportional to that voltage. Such a circuit may be used, for instance, in a digital voltmeter where the voltage to be measured is converted into a time interval during which uniformly spaced pulses from a local oscillator are counted. This time interval may be comprised between a start pulse and a stop pulse which gate the local oscillator. "Measuring" as used in this application refers therefore to the conversion of a voltage into a time interval.

In a circuit of this type the voltage to be converted to a time interval is directly coupled to an input terminal of a differential amplifier. Upon the occurrence of a start pulse a capacitor is connected to a source of constant current and charged. The voltage across the capacitor is directly coupled to the other input terminal of the differential amplifier. The output of the differential amplifier is limited so that there is saturation until the two input voltages are nearly equal, at which time the differential amplifier generates a step voltage which is differentiated to obtain a stop pulse. As long as the charging curve (voltage vs. time) of the capacitor is linear, the voltage across the capacitor, which is referred to as the "ramp" voltage, rises linearly with time. The time interval between the start and stop pulses is therefore proportional to the voltage which is to be measured.

Drift voltages in the differential amplifier introduce inaccuracies in the above arrangement. These drift voltages add or subtract a small voltage increment to the input of the differential amplifier and introduce therefore an error in the timing of the stop pulse with respect to the start pulse.

It is an object of this invention to provide an improved voltage to time-interval converter.

It is another object of this invention to minimize the effect of drift voltages in a voltage to time-interval converter of the type described above.

In accordance with the illustrated embodiment of this invention the effects of these drift voltages are minimized by providing a total negative direct-current feedback loop between the output and one of the inputs of the differential amplifier. When a measurement is taken the feedback loop is opened and the ramp voltage is applied to that input, while the voltage to be measured is applied to the other input. This total feedback provides a correction which nearly eliminates the effect of drift voltages.

Other and incidental objects of this invention will be apparent to those skilled in the art from a reading of this specification and an inspection of the accompanying drawing which is a block and circuit diagram of a digital voltmeter using the voltage to time-interval converter of this invention.

Referring now to the drawing there is shown a free-running local oscillator 11 which generates uniformly spaced pulses. The output of the oscillator 11 is fed to an oscillator gate 13. The gate 13 is opened by applying a start pulse to its input 15 and closed by applying a stop pulse to its input 17. The output of the gate 13 is connected to a counter 19.

A differential amplifier 21 has two inputs 23 and 25 and an output 27. The voltage which is to be measured is applied between input terminal 31 and ground 32 to the differential amplifier input 23 through a first switch

29 of a mechanical chopper 33. The switch 29 may be selectively connected either to the input terminal 31 or to ground 32. The other differential amplifier input 25 is connected to the ungrounded terminal 37 of a signal storage device such as capacitor 39. The terminal 37 is connected to a constant current source 41 which is gated by a gate 43. The gate 43 is operated by a timer 45 which supplies a start pulse to the input 15 of the oscillator gate 13 over connection 47. The differential amplifier output 27 supplies a stop pulse to the input 17 of the oscillator gate 13 through a limiter 49. A total direct-current negative feedback loop, which comprises a current limiting resistor 50, is connected between the output 27 and the input 25 of the differential amplifier 21. This feedback loop comprises a second chopper switch 51. The operation of the chopper 33, and therefore of the switches 29 and 51, is controlled by the timer 45.

The operation of the device shown in the drawing is as follows: before a voltage measurement is taken the switch 29 is connected to ground and the switch 51 is closed. Any drift voltage appearing at the output terminal 27 is therefore fed back to the input terminal 25, amplified by the differential amplifier 21 (the other input 23 of which is grounded) and cancelled out at the output terminal which is thus brought to ground potential. The voltage E at input terminal 25 which is required to cancel this drift voltage is usually of the order of a small fraction of a volt and is stored on the capacitor 39. When a voltage measurement is taken, the timer 45 causes the operation of the chopper 33 so that the switch 51 opens and the switch 29 shifts from ground 32 to the input terminal 31. The chopper operates both switches 29 and 51 simultaneously so that switch 51 opens the feedback loop as the switch 29 breaks the connection with ground terminal 32. The transit time of switch 29 leaves a short time interval (i.e. one millisecond) between the opening of the feedback loop and the connection of input terminal 31 to the input terminal 23 of amplifier 21. The feedback loop is now opened and the amplifier will stay balanced for a short time as the voltage to accomplish this is stored on capacitor 39. After an interval of about five milliseconds designed to allow transients to die out the timer 45 sends a start pulse to the input 15 of the oscillator gate 13. Simultaneously the timer 45 opens the gate 43 and thus connects the constant current source 41 to capacitor 39 which starts charging. When the difference between the voltages applied to differential amplifier inputs 23 and 25 becomes less than E plus one-half millivolt the differential amplifier stops being saturated and generates a step function which can be differentiated and applied as a stop pulse to the input 17 of the oscillator gate 13. The timer 45 now operates the chopper 33 so as to connect the switch 29 back to ground 35 and to close the switch 51. The feedback loop is now closed. The high charge on the capacitor 39 is discharged through limiter 49, and the feedback charges the capacitor to the small voltage E necessary to correct for the amplifier drift voltage. This small voltage is not discharged as it is considerably less than the breakdown voltage of the diodes 53 and 55 of the limiter 49. The circuit is now ready to take another measurement by repeating the process described above.

I claim:

A voltage to time-interval converter designed to convert the value of a voltage applied between an input terminal and ground into a time interval proportional to said voltage, said converter comprising a direct-coupled differential amplifier having first and second inputs and an output, first switching means to connect selectively the first input of said differential amplifier either to said input terminal or to a point of reference potential, a total direct-current negative feedback loop connected between the output and the second input of said differential amplifier, said feedback loop comprising second switching means to selectively open or close said feedback loop, a timer, a constant current source, a signal storage device connected to the second input of said differential amplifier, means responsive to said timer to actuate said second switching means and open said feedback loop, means responsive to said time to actuate said first switching means thus connecting the first input of said amplifier to said input terminal a short time interval after said feedback loop has been opened, means responsive to said timer to connect said constant current source to said signal storage device a short time interval after the first input of the amplifier has been connected to said input terminal and to simultaneously provide a signal indicating the start of said time interval, and means responsive to the output signal of said differential amplifier to provide a signal indicating the end of said time interval when the voltages on both of the inputs of said differential amplifier are substantially equal.

References Cited in the file of this patent

UNITED STATES PATENTS

| | | |
|---|---|---|
| 2,285,482 | Wunsch | June 9, 1942 |
| 2,501,704 | Wilson | Mar. 28, 1950 |
| 2,596,955 | Howe | May 13, 1952 |
| 2,761,968 | Kuder | Sept. 4, 1956 |
| 2,784,396 | Kaiser et al. | Mar. 5, 1957 |
| 2,824,285 | Hunt | Feb. 18, 1958 |
| 2,833,921 | McCrory | May 6, 1958 |

FOREIGN PATENTS

| | | |
|---|---|---|
| 609,381 | Great Britain | Sept. 29, 1948 |